United States Patent
Hureau et al.

(10) Patent No.: US 11,455,026 B2
(45) Date of Patent: Sep. 27, 2022

(54) POWER MODE TRANSITION MANAGEMENT FOR CASCADED POWER SUPPLY

(71) Applicant: NXP USA, Inc., Austin, TX (US)

(72) Inventors: Loic Hureau, Toulouse (FR); Jean-Philippe Meunier, Ayguesvives (FR); Daniel McKenna, Glasgow (GB)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/999,188

(22) Filed: Aug. 21, 2020

(65) Prior Publication Data

US 2021/0089114 A1 Mar. 25, 2021

(30) Foreign Application Priority Data

Sep. 23, 2019 (EP) ..................................... 19306163

(51) Int. Cl.
*G06F 1/00* (2006.01)
*G06F 1/3296* (2019.01)
*G06F 1/28* (2006.01)

(52) U.S. Cl.
CPC .............. *G06F 1/3296* (2013.01); *G06F 1/28* (2013.01)

(58) Field of Classification Search
CPC .................................................... G06F 1/3296
See application file for complete search history.

(56) References Cited

U.S. PATENT DOCUMENTS

| | | | |
|---|---|---|---|
| 6,465,909 B1 | 10/2002 | Soo et al. | |
| 9,158,921 B1 | 10/2015 | Gupta et al. | |
| 10,790,742 B1* | 9/2020 | Petersen | H02M 3/07 |
| 2004/0015273 A1* | 1/2004 | Leonard | F42C 17/04 |
| | | | 701/3 |
| 2011/0022859 A1 | 1/2011 | More et al. | |
| 2011/0149525 A1* | 6/2011 | Turner | H05K 7/207 |
| | | | 361/730 |
| 2014/0369085 A1* | 12/2014 | Motoki | G06F 1/266 |
| | | | 307/116 |
| 2016/0014700 A1 | 1/2016 | Taha et al. | |
| 2016/0196227 A1* | 7/2016 | Yoo | G06F 13/4068 |
| | | | 710/110 |
| 2017/0038997 A1* | 2/2017 | Haque | G06F 3/0688 |
| 2017/0371402 A1 | 12/2017 | Cooper et al. | |
| 2018/0004704 A1* | 1/2018 | Czakó | G06F 13/1673 |

(Continued)

*Primary Examiner* — Mohammed H Rehman

(57) ABSTRACT

A cascaded power system including master power management circuitry and slave power management circuitry. The master circuitry includes a master power regulator, comparator circuitry, and control circuitry. The power regulator provides a supply voltage during a normal mode and discharges the supply voltage during a low power mode. The slave circuitry provides a core voltage when enabled and otherwise discharges the core voltage. The comparator circuitry monitors the voltage levels of the supply and core voltages and the control circuitry performs handshaking with the slave circuitry based partly on the voltages to ensure smooth transitioning between the normal and low power modes. The control circuitry asserts a low power good signal when the supply and core voltages are discharged, and de-asserts the low power good signal when the supply and core voltages are fully charged. A processor may rely on the low power mode signal for transitioning between power modes.

20 Claims, 3 Drawing Sheets

(56) References Cited

U.S. PATENT DOCUMENTS

| | | |
|---|---|---|
| 2018/0059756 A1 | 3/2018 | Gallimore et al. |
| 2018/0060085 A1* | 3/2018 | Ananthakrishnan ........................ G06F 12/0897 |
| 2018/0129269 A1* | 5/2018 | Garg ..................... G06F 9/4418 |
| 2019/0064910 A1 | 2/2019 | Wang et al. |
| 2019/0250697 A1 | 8/2019 | Mocanu et al. |

* cited by examiner

POWER MODE TRANSITION MANAGEMENT FOR CASCADED POWER SUPPLY

BACKGROUND

Field of the Invention

The present invention relates in general to power mode management, and more particularly to a system and method of ensuring that power mode transitions take place in a robust, safe and secure manner to reduce potential of failure for a cascaded power supply.

Description of the Related Art

Safety is a concern for certain applications, such as automotive applications or industrial applications and the like. A semiconductor device or integrated circuit (IC) configured for such applications may be implemented with a significant amount of computing capacity. A processing system, such as including a microprocessor, microcontroller, system on chip or any other processing configuration, may be used to process any type of data or information to control certain parameters, functions or operations associated with a particular application. Automotive applications may include, for example, gateways (e.g., in-vehicle networking and telematics), adaptive driver assistance systems (ADAS), infotainment (audio and/or video entertainment, information, navigation, hands-free control, etc.), clusters (digital instrumentation, heads-up display, etc.), vehicle to everything (V2X) (e.g., communication between a vehicle and external entities, traffic sign recognition, etc.), radar, vision (e.g., cameras, proximity sensors, collision avoidance, blind spot monitoring, etc.). Industrial applications may include, for example, industrial tablets or laptops and the like, internet protocol television (IPTV), industrial control, medical monitoring, home automation and/or alarm systems, etc.

The processing system may consume a substantial amount of power or may need a significant number of different supply voltages such that a single power management IC (PMIC) may be insufficient to supply the requisite level of power or the requisite number of different supply voltages to the processing device, the memory devices, the communication devices, etc. A cascaded power supply scheme may be used to fulfil the requisite power demand, which may include a master PMIC and one or more slave PMICs. The processing system may have a low power mode (e.g., reduced power mode, sleep mode, standby mode, etc.) to minimize power consumption during periods of low activity or inactivity in which all but a minimum amount of circuitry or logic is powered down. The cascaded PMIC scheme may be used to provide supply and core voltages to the processing system and may further be used to control the power mode including transitioning between normal and low power modes. In such a configuration, any miscommunication between the master and slave PMICs could lead to power being removed at an incorrect time, causing a main processing device and any corresponding peripherals to be unexpectedly powered down. For applications in which safety is a concern including safety critical applications, the consequences of unexpected power down could be inconvenient or even dangerous in the event the system is unable to transition to a safe state.

SUMMARY

Aspects of the disclosure are defined in the accompanying claims.

In a first aspect, there is provided a cascaded power supply, comprising master power management circuitry and slave power management circuitry. The master power management circuitry comprises: a master power regulator that provides a supply voltage during a normal mode and that discharges the supply voltage during a low power mode; comparator circuitry that monitors voltage levels of the supply voltage and a core voltage and that provides at least one status signal indicative thereof; and control circuitry that de-asserts a slave enable signal and commands the master power regulator to discharge the supply voltage when a low power mode signal is asserted for transitioning from the normal mode to the low power mode, and that asserts a low power good signal when the at least one status signal indicates that the supply voltage is discharged below a first low threshold and that the core voltage is discharged below a second low threshold. The slave power management circuitry provides the core voltage when the slave enable signal is asserted for the normal mode, and discharges the core voltage when the slave enable signal is de-asserted for the low power mode.

In one or more embodiments, the control circuitry may command the master power regulator to charge the supply voltage when the low power mode signal is de-asserted, may assert the slave enable signal when the supply voltage is at least a first high threshold, and may de-assert the low power good signal to enter the normal mode when a synchronization signal is asserted after the slave enable signal is asserted; and the slave power management circuitry may assert the synchronization signal when the core voltage reaches a regulation level.

In one or more embodiments, the control circuitry may de-assert the low power good signal to enter the normal mode only after the core voltage is at least a second high threshold.

In one or more embodiments, the control circuitry may command the master power regulator to charge the supply voltage when the low power mode signal is de-asserted, may assert the slave enable signal when the supply voltage is at least a first high threshold, and may de-assert the low power good signal to enter the normal mode only after the core voltage is at least a second high threshold.

In one or more embodiments, the master power management circuitry may be implemented on a first semiconductor device, and the slave power management circuitry may be implemented on a second semiconductor device.

In one or more embodiments, the cascaded power supply of claim 1 may further comprise a processor that provides the low power mode signal and that receives the low power good signal.

In one or more embodiments, the processor only transitions from the normal mode to the low power mode when the low power good signal is asserted, and only transitions from the low power mode to the normal mode when the low power good signal is de-asserted.

In one or more embodiments, the master power management circuitry may be implemented on a first semiconductor device, the slave power management circuitry may be implemented on a second semiconductor device, and the processor may be implemented on a third semiconductor device.

In a second aspect, there is provided a method, comprising: providing master power management circuitry and providing slave power management circuitry. Providing master power management circuitry, comprising: providing a supply voltage during a normal mode and discharging the supply voltage during a low power mode; monitoring voltage levels of the supply voltage and a core voltage and providing at least one status signal indicative thereof; and de-asserting a slave enable signal and commanding the master power regulator to discharge the supply voltage when a low power mode signal is asserted for transitioning from a normal mode to a low power mode, and asserting a low power good signal when the at least one status signal indicates that the supply voltage is discharged below a first low threshold and that the core voltage is discharged below a second low threshold. Providing slave power management circuitry, comprising: providing the core voltage when the slave enable signal is asserted for the normal mode, and otherwise discharging the core voltage for the low power mode.

In one or more embodiments, the method may further comprise: commanding the master power regulator to charge the supply voltage when the low power mode signal is de-asserted; asserting the slave enable signal when the supply voltage is at least a first high threshold; asserting the synchronization signal when the core voltage reaches a regulation level; and de-asserting the low power good signal to enter the normal mode when a synchronization signal is asserted after the slave enable signal is asserted.

In one or more embodiments, the method may further comprise de-asserting the low power good signal to enter the normal mode only after the core voltage is at least a second high threshold.

In one or more embodiments, the method may further comprise: commanding the master power regulator to charge the supply voltage when the low power mode signal is de-asserted; asserting the slave enable signal when the supply voltage is at least a first high threshold; and de-asserting the low power good signal to enter the normal mode only after the core voltage is at least a second high threshold.

In one or more embodiments, the providing master power management circuitry may comprise providing the master power management circuitry on a first semiconductor device, and the providing slave power management circuitry may comprise providing the slave power management circuitry on a second semiconductor device.

In one or more embodiments, the method may further comprise providing a processor that provides the low power mode signal and that receives the low power good signal.

In one or more embodiments, the method may further comprise transitioning, by the processor, from the normal mode to the low power mode only when the low power good signal is asserted, and transitioning, by the processor, from the low power mode to the normal mode only when the low power good signal is de-asserted.

In one or more embodiments, the providing master power management circuitry may comprise providing the master power management circuitry on a first semiconductor device, the providing slave power management circuitry may comprise providing the slave power management circuitry on a second semiconductor device, and providing a processor may comprise providing the processor on a third semiconductor device.

In a third aspect, there is provided a processing system, comprising: a cascaded power management system and a processor. The cascaded power management system, comprises: a master power management circuitry and a slave power management circuitry. The master power management circuitry, comprises: a master power regulator that provides a supply voltage during a normal mode and that discharges the supply voltage during a low power mode; comparator circuitry that monitors voltage levels of the supply voltage and a core voltage and that provides at least one status signal indicative thereof; and control circuitry that de-asserts a slave enable signal and commands the master power regulator to discharge the supply voltage when a low power mode signal is asserted for transitioning from the normal mode to the low power mode, and that asserts a low power good signal when the at least one status signal indicates that the supply voltage is discharged below a first low threshold and that the core voltage is discharged below a second low threshold. The slave power management circuitry provides the core voltage when the slave enable signal is asserted for the normal mode, and that discharges the core voltage when the slave enable signal is de-asserted for the low power mode. The processor comprises: power supply circuitry that receives the supply voltage and the core voltage; and low power domain circuitry that provides the low power mode signal and that receives the low power good signal, wherein the processor only transitions from the normal mode to the low power mode when the low power good signal is asserted, and only transitions from the low power mode to the normal mode when the low power good signal is de-asserted.

In one or more embodiments, the control circuitry may command the master power regulator to charge the supply voltage when the low power mode signal is de-asserted, may assert the slave enable signal when the supply voltage is at least a first high threshold, and may de-assert the low power good signal to enter the normal mode when a synchronization signal is asserted after the slave enable signal is asserted; and the slave power management circuitry may assert the synchronization signal when the core voltage reaches a regulation level.

In one or more embodiments, the control circuitry may de-assert the low power good signal to enter the normal mode only after the core voltage is at least a second high threshold.

In one or more embodiments, the control circuitry may command the master power regulator to charge the supply voltage and when the low power mode signal is de-asserted, may assert the slave enable signal when the supply voltage is at least a first high threshold, and may de-assert the low power good signal to enter the normal mode only after the core voltage is at least a second high threshold.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized that it is advantageous to provide a robust and safe method to transition between a normal mode of operation and one or more low power modes of operation between two or more power management ICs (PMICs). The normal mode means that the system is fully powered to perform the functions and operations for which the system was designed. The one or more low power modes include any reduced power mode (e.g., reduced power mode, sleep mode, standby mode, etc.) that reduces quiescent current in order to reduce overall power consumption. A system and method of power mode management as described herein provides dedicated interactions between a master PMIC and at least one slave PMIC to ensure that the low-power mode transition takes place in a safe and robust manner. This removes the potential for a critical failure.

Figure 1:
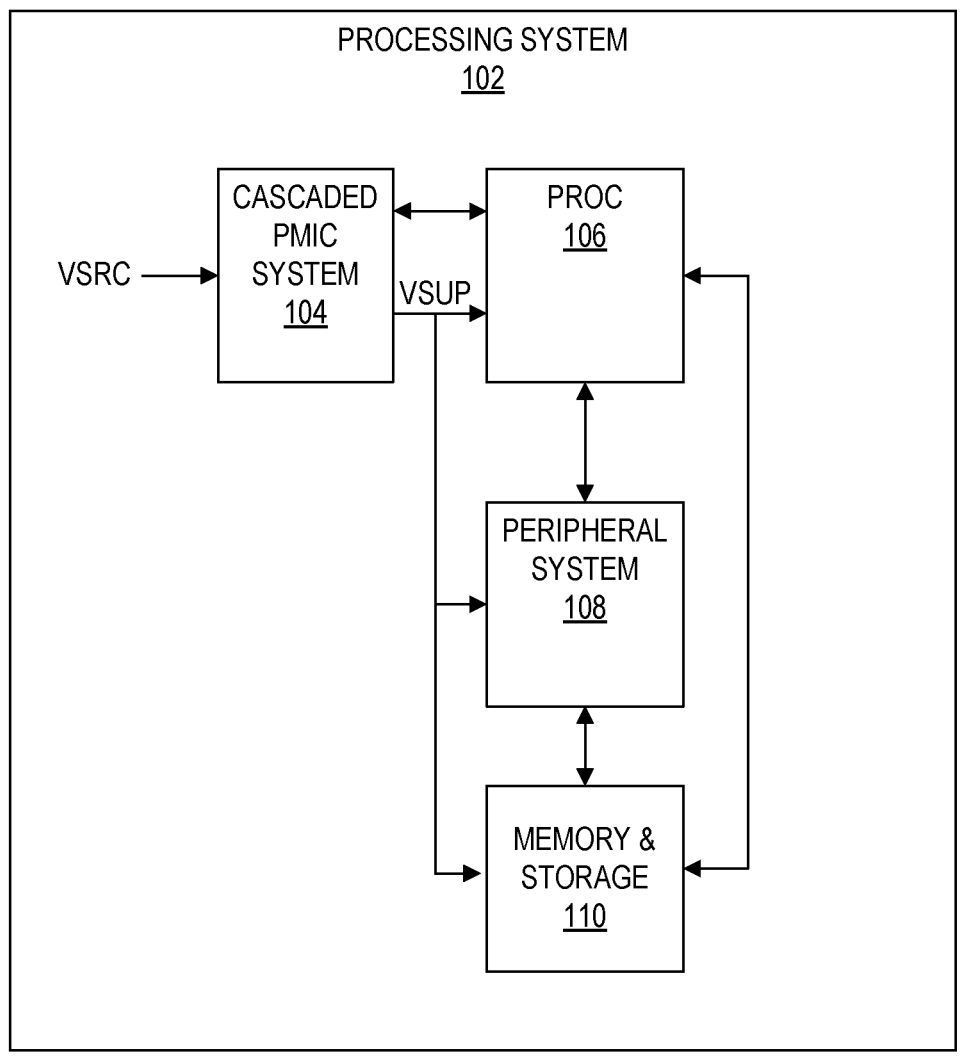
FIG. 1 is a simplified block diagram of a processing system implemented according to one embodiment of the present disclosure.

FIG. 1 is a simplified block diagram of a processing system 102 implemented according to one embodiment of the present disclosure. The processing system 102 may be implemented in a discrete manner or may be integrated onto a single module, such as a system on chip (SoC) or the like. The processing system 102 includes a cascaded power management IC (PMIC) system 104 which provides power to a processor (PROC) 106, a peripheral system 108, and a memory & storage system 110. The cascaded PMIC system 104 cooperates with the processor 106 to ensure that power mode transitions of the processing system 102 (including transitions of the processor 106 and any of the other devices) take place in a robust and secure manner to reduce potential of failure as further described herein. The processor 106 may include any type of processing device or the like, such as programmable integrated circuit, a microprocessor, a microcontroller or MCU, a central processing unit (CPU), an application processor, etc., and may include multiple processing devices. The memory & storage system 110 may include one or more of any type of memory or storage devices or any combination thereof, including, for example, random access memory (RAM), dynamic RAM (DRAM), synchronous DRAM (SDRAM), low power double data rate (DDR) (LPDDR4), non-volatile memory such as serial peripheral interface (SPI) Flash memory 190, NVRAM, Flash memory, solid state drive/s (SSDs), hard disk drive/s, optical drives, or any other suitable form of internal or external storage. The memory and storage devices may be incorporated on the processing system 102, or instead the memory & storage system 110 may be configured as interfaces to external memory or drives or the like.

The processing system 102 may be used to implement or may be part of an automotive application or an industrial application or the like in which safety and robustness are of concern. The peripheral system 108 may be used to interface sensors, communication devices, detectors, display devices, keyboards, controllers, mice, etc., to enable the processor 106 to process any type of data or information to control certain parameters, functions or operations associated with the particular application. In many such applications, the processing system 102 includes a low power mode to reduce power consumption in which only a minimal amount of logic and circuitry remains powered sufficient to reawaken the processing system 102 to resume normal operations. The cascaded PMIC system 104 converts a source voltage (VSRC) into one or more supply voltages (VSUP) provided to the processor 106, the peripheral system 108, the memory & storage system 110 (and any other devices or peripherals) and further facilitates transitioning the processing system 102 and the processor 106 between its normal and low power modes as further described herein. VSRC may originate from an external power source (not shown), such as an external battery (e.g., automotive battery) or an AC source or the like, or may be provided by a power converter (not shown) of the processing system 102. The cascaded PMIC system 104 also has a low power mode in which it maintains a very low yet sufficient level of operation to detect a request to reawaken the system. A request to reawaken the system may come from any one of multiple sources, such as, for example, the processor 106 or the peripheral system 108.

Figure 2:
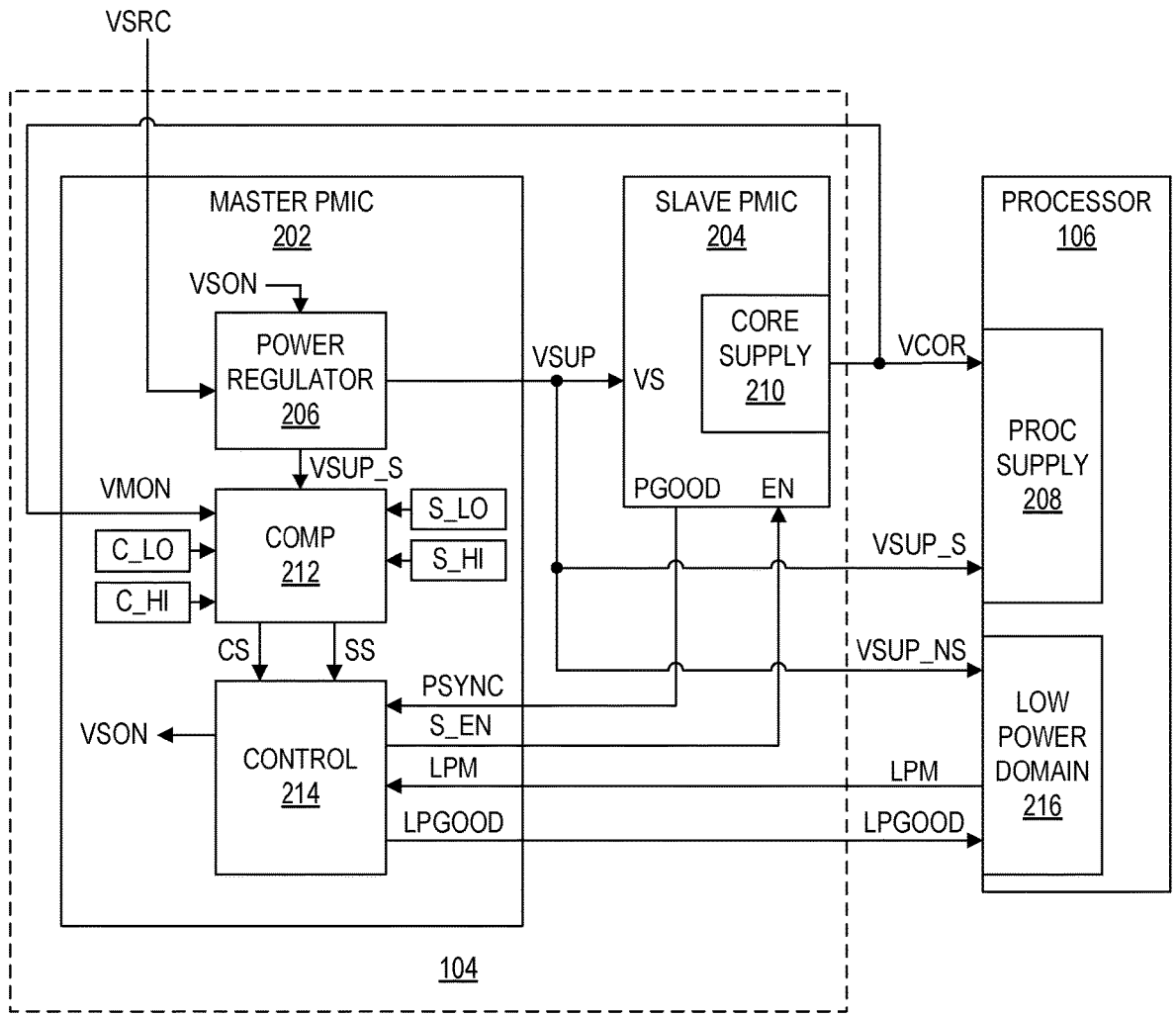
FIG. 2 is a more detailed block diagram of the cascaded PMIC system interfacing the processor of FIG. 1 for controlling power mode transitions according to one embodiment of the present disclosure.

FIG. 2 is a more detailed block diagram of the cascaded PMIC system 104 interfacing the processor 106 for controlling power mode transitions according to one embodiment of the present disclosure. Although not specifically shown or described herein, the cascaded PMIC system 104 may also control power mode transitions for the peripheral system 108 and the memory & storage system 110. The cascaded PMIC system 104 includes a master PMIC 202 and a slave PMIC 204. Although only one slave PMIC 204 is shown, additional slave PMICs (not shown) may be included (such as, for example, for any additional processors or high power circuitry or the like). The master PMIC 202 includes power regulator circuitry 206 that converts the VSRC voltage into one or more supply voltages, generally shown as VSUP. VSUP may be a single supply voltage or may include multiple voltages depending upon the configuration of the slave PMIC 204 and the processor 106.

In one embodiment, VSUP includes at least one switchable supply voltage, shown as VSUP_S, which has a voltage level that depends upon a command signal VSON as further described herein. VSUP may also include a non-switched supply voltage VSUP_NS. VSUP_S is provided to a voltage supply (VS) input of the slave PMIC 204 and to an input of processor supply circuitry 208 of the processor 106. VSUP_NS is provided to an input of a low power domain 216 of the processor 106 and possibly to other peripheral devices that may remain powered in the low power mode. When VSON is de-asserted low (e.g., VSON=0), the power regulator circuitry 206 discharges VSUP_S while VSUP_NS remains charged so that the low power domain 216 remains powered during the low power mode. It is noted that VSUP may include one or more switched supply voltages and one or more non-switched supply voltages. In addition, whether a supply voltage is switched or not may be configurable based on a register setting or the like. The slave PMIC 204 includes core supply circuitry 210 that converts VSUP to a core voltage VCOR provided to a CORE voltage input of the processor supply 208. VCOR is also provided to a voltage monitor (VMON) input of the master PMIC 202. In an alternative embodiment, the slave PMIC 204 may separately receive and convert VSRC to VCOR.

The master PMIC 202 includes comparator circuitry 212 that monitors the voltage levels of VSUP_S and VCOR (via VMON) and control circuitry 214 that manages transitions between the normal and low power operating modes as further described herein. The master PMIC 202 has a slave enable output S_EN provided to an enable input EN of the slave PMIC 204. The slave PMIC 204 has a power good output PGOOD provided to a power synchronization input PSYNC of the master PMIC 202. The processor 106 includes the low power domain 216 that remains powered during the low power mode. The low power domain 216 provides a low power mode signal LPM to an LPM input of the master PMIC 202, and the master PMIC 202 has a low power good output LPGOOD that provides an LPGOOD signal to an input of the low power domain 216 of the processor 106.

The comparator circuitry 212 compares VSUP_S with configurable values S_LO and S_HI and provides a supply voltage status signal SS to the control circuitry 214, and further compares VCOR with configurable values C_LO and C_HI and provides a core voltage status signal CS to the control circuitry 214. S_LO represents a discharged voltage level of VSUP_S and S_HI represents a nominal operating voltage level of VSUP_S. SS may include multiple signals indicating the relative state of VSUP_S with respect to S_LO and S_HI. For example, SS may indicate when VSUP_S<S_HI, when VSUP_S≥S_HI, when VSUP_S>S_LO, or when VSUP_S≤S_LO. Similarly, C_LO represents a discharged voltage level of VCOR and C_HI represents a nominal operating voltage level of VCOR. CS may include multiple signals indicating the relative state of VCOR with respect to C_LO and C_HI. For example, CS may indicate when VCOR<C_HI, when VCOR≥C_HI, when VCOR>C_LO, or when VCOR C_LO. The comparator circuitry 212 may be implemented in the digital domain in which VSUP_S and VCOR are converted to digital values and where S_LO, S_HI, C_LO and C_HI may be stored as digital values.

The control circuitry 214 receives CS, SS, PSYNC and LPM and provides LPGOOD, VSON, and S_EN. In an alternative embodiment, the comparator circuitry 212 may be simplified by not comparing VCOR with C_HI so that C_HI may be omitted. Instead, the control circuitry 214 relies on PSYNC for determining when VCOR is at or above its nominal regulation voltage level.

Figure 3:
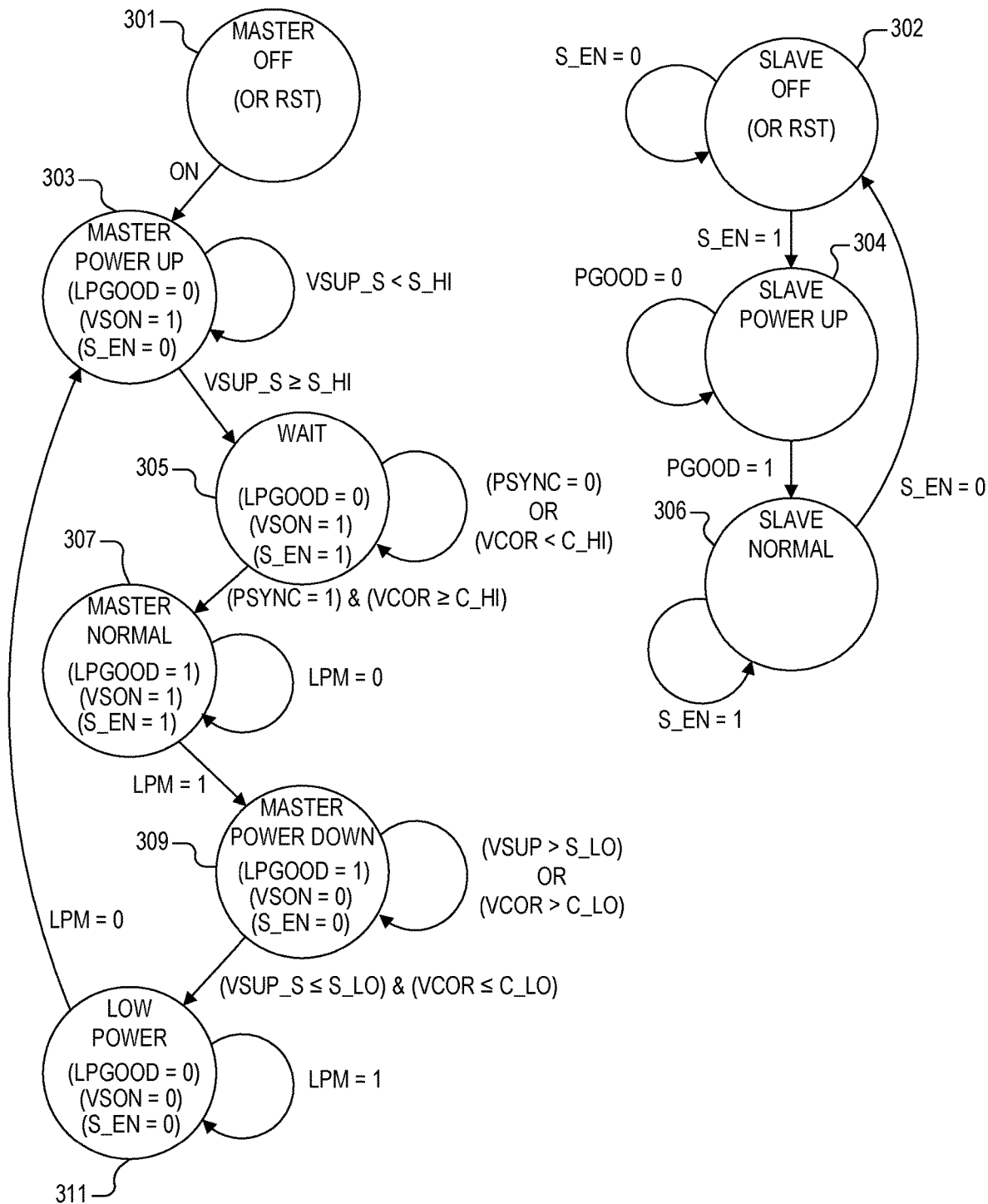
FIG. 3 is a state diagram illustrating operation of the cascaded PMIC system of FIG. 1 including the master PMIC and the slave PMIC of FIG. 2 according to one embodiment of the present disclosure.

FIG. 3 is a state diagram illustrating operation of the cascaded PMIC system 104 including the master PMIC 202 and the slave PMIC 204 according to one embodiment of the present disclosure. Operation begins in OFF states for both the master PMIC 202, shown as MASTER OFF state 301 for the master PMIC 202 and SLAVE OFF state 302 for the slave PMIC 202. The OFF states may mean that the processing system 102 is off or held in a reset state. When a power on indication is received, shown as ON, the master PMIC 202 transitions to a MASTER POWER UP state 303. In the MASTER POWER UP state 303, the control circuitry 214 of the master PMIC 202 de-asserts S_EN signal low (e.g., S_EN=0) to keep the slave PMIC 204 in its OFF state 202, and asserts the LPGOOD signal low (e.g., LPGOOD=0) to keep the processor 106 in its reset state. At this time the low power domain 216 of the processor 106 may be powered up, but it does not attempt to power up the remaining portions of the processor 106 until the LPGOOD signal is de-asserted high.

Upon transitioning to the MASTER POWER UP state 303, the regulators within the power regulator circuitry 214 begin converting the source voltage VSRC into the supply voltages VSUP. In the MASTER POWER UP STATE 303, the control circuitry 214 asserts VSON high (e.g., VSON=1) to command that the power regulator 206 charge the supply voltage VSUP_S for providing power to the slave PMIC 204 and the processor 106. The comparator circuitry 212 monitors the voltage level of VSUP_S and the control circuitry 214 keeps the master PMIC 204 in the MASTER POWER UP state 303 while VSUP_S is below a configurable voltage level S_HI (e.g., VSUP_S<S_HI). If VSUP_S represents multiple voltages, then each may have a corresponding threshold voltage level in which S_HI represents multiple voltage level thresholds. When the voltage level of VSUP_S reaches or otherwise exceeds S_HI (e.g., when VSUP_S≥S_HI), then the master PMIC 202 transitions to a WAIT state 305 and the control circuitry 214 asserts the S_EN signal high to enable the slave PMIC 204. The control circuitry 214 keeps VSON high and also keeps LPGOOD asserted low to keep the processor 106 in its reset state. When S_EN=1, the slave PMIC 204 transitions to a SLAVE POWER UP state 304 in which the core supply circuitry 210 begins charging the core voltage VCOR (such as based on converting VSUP or VSRC or the like).

Meanwhile, in the WAIT state 305 the control circuitry 214 of the master PMIC 202 monitors the PSYNC input. The compare circuitry 212 may also monitor the voltage level of VCOR via the VMON input. The master PMIC 202 remains in the WAIT state 305 while either PSYNC is de-asserted low (e.g., PSYNC=0) and while the VCOR remains below C_HI. The slave PMIC 204 remains in the SLAVE POWER UP state 304 until VCOR is regulated as indicated by its output PGOOD. When the core supply circuitry 210 achieves regulation of VCOR, PGOOD is asserted high (e.g., PGOOD=1) and the slave PMIC 204 transitions to a SLAVE NORMAL state 306. When PGOOD=1, the PSYNC input of the master PMIC 202 is asserted high (e.g., PSYNC=1) and the control circuitry 214 either assumes that VCOR is at its regulation level in a first embodiment, or additionally monitors CS to ensures that the voltage level of VCOR is greater than or equal to C_HI. When PSYNC=1 (and VCOR C_HI), the master PMIC 202 transitions to a MASTER NORMAL state 307 for the normal mode of operation.

When in the MASTER NORMAL state 307, the control circuitry 214 releases LPGOOD high (e.g., LPGOOD=1) to allow the processor 106 to power up and operate in its normal mode. In this manner, the processor 106 is prevented from starting up until sufficient power is available via VSUP_S and VCOR. A premature startup without sufficient power may cause the processing system 102 to trigger and unwanted reset. The processor 106 keeps its LPM output low (e.g., LPM=0) indicating that it is in its normal mode of operation, and also keeps VSON and S_EN asserted high. In the normal mode of operation, the master PMIC 202 remains in its MASTER NORMAL state 307 and the slave PMIC 204 remains in its SLAVE NORMAL state 306. It is noted that S_EN may also be provided to one or more of the regulators of the power regulator 206 to manage a defined startup sequence between the regulators.

When the processor 106 determines to enter or re-enter its low power mode, it asserts its LPM output high (or LPM=1). The control circuitry 214 detects LPM asserted high and transitions the master PMIC 202 to a MASTER POWER DOWN state 309. In the MASTER POWER DOWN state 309, the control circuitry 214 de-asserts S_EN low (e.g., S_EN=0) to power down the slave PMIC 204. In response, the slave PMIC 204 transitions back to its SLAVE OFF state 302 and begins discharging VCOR back low. In the MASTER POWER DOWN state 309, the control circuitry 214 also de-asserts VSON low (e.g., VSON=0) to command that the power regulator circuitry 206 of the master PMIC 202 begin discharging VSUP_S to power down the PMIC slave 204 and the processor 106. The master PMIC 202 remains in the MASTER POWER DOWN state 309 while VSUP_S remains greater than a configurable low threshold S_LO (e.g., VSUP_S>S_LO) and while VCOR remains greater than a configurable low threshold C_LO (e.g., VCOR>C_LO). In the MASTER POWER DOWN state 309, the control circuitry 214 also keeps LPGOOD de-asserted high so that the processor 106 does not prematurely begin transitioning to its low power state. A premature transition to low power may result in residual internal biasing of the processor 106, which is disadvantageous when restarting.

The comparator circuitry 212 and the control circuitry 214 monitor VSUP_S and VCOR in the MASTER POWER DOWN state 309. When VSUP_S is less than or equal to S_LO (e.g., VSUP_S≤S_LO) and when VCOR is less than or equal to C_LO (e.g., VCOR≤C_LO), then the master PMIC 202 transitions to a LOW POWER state 311. S_LO and C_LO may be chosen as sufficiently low values to prevent residual internal biasing, and may be represent a value that is equal to or very close to 0 Volts (V) each. In the LOW POWER state 311, the control circuitry 214 of the master PMIC 202 keeps S_EN de-asserted low to keep the slave PMIC 204 in the SLAVE OFF state 302, and keeps VSON low to keep VSUP_S discharged. In the LOW POWER state 311, the control circuitry 214 asserts the LPGOOD signal low (e.g., LPGOOD=0) so that the processor 106 may transition to its low power state. LPGOOD is asserted in order to prevent unpredictable behavior due to an aborted or disrupted low power entry sequence. The master PMIC 202 remains in the LOW POWER state 311 while LPM remains asserted high by the processor 106.

When the processor 106 determines to re-enter its normal mode of operation, it de-asserts its LPM output low (or LPM=0). The control circuitry 214 detects LPM de-asserted low and transitions the master PMIC 202 back to the MASTER POWER UP state 303. As previously described, when in the MASTER POWER UP state 303, the control circuitry 214 de-asserts the S_EN signal low (e.g., S_EN=0) to keep the slave PMIC 204 in its OFF state 202, and asserts the LPGOOD signal low (e.g., LPGOOD=0) to keep the processor 106 in its low power state. Also, the control circuitry 214 re-asserts VSON high to command that the power regulator circuitry 206 begin recharging the switched supply voltage VSUP_S for providing power to the slave PMIC 204 and the processor 106 as previously described, and operation transitions to the WAIT state 305 and then the MASTER NORMAL state 307 in response to the same conditions previously described. When in the WAIT state 305, the S_EN signal is asserted high to power up the slave PMIC 204 in a similar manner previously described for providing VCOR to the processor 106.

It is appreciated that the processor 106 only communicates with the master PMIC 202 and does not communicate with the slave PMIC 204. In fact, the circuitry of the processor 106 may not even be aware that the slave PMIC 204 is present other than by receiving the core voltage VCOR. It is noted that the processor 106 communicates the desire to transition between the low power and normal operating modes using a single signal LPM. Although not shown, additional communications or additional signals may be included for signaling transition between the different operating modes. For example, a separate LPM_EXIT signal (not shown) may be incorporated for exiting the low power mode, in which case LPM is used only for entering the low power mode.

A cascaded power supply according to one embodiment includes master power management circuitry and slave power management circuitry. The master power management circuitry includes a master power regulator, comparator circuitry, and control circuitry. The master power regulator provides a supply voltage during a normal mode and discharges the supply voltage during a low power mode. The comparator circuitry monitors voltage levels of the supply voltage and a core voltage and provides at least one status signal indicative thereof. The control circuitry de-asserts a slave enable signal and disables the master power regulator when a low power signal is asserted for transitioning from the normal mode to the low power mode, and asserts a low power good signal when the at least one status signal indicates that the supply voltage is discharged below a first low threshold and the core voltage is discharged below a second low threshold. The slave power management circuitry provides the core voltage when the slave enable signal is asserted for the normal mode, and discharges the core voltage when the slave enable signal is de-asserted for the low power mode.

The control circuitry may command the master power regulator to charge the supply voltage when the low power mode signal is de-asserted, may assert the slave enable signal when the supply voltage is at least a first high threshold, and may de-assert the low power good signal to enter the normal mode when a synchronization signal is asserted after the slave enable signal is asserted. The slave power management circuitry may assert the synchronization signal when the core voltage reaches a regulation level. In addition, the control circuitry may de-assert the low power good signal to enter the normal mode only after the core voltage is at least a second high threshold.

The control circuitry may command the master power regulator to charge the supply voltage when the low power mode signal is de-asserted, may assert the slave enable signal when the supply voltage is at least a first high threshold, and may de-assert the low power good signal to enter the normal mode only after the core voltage is at least a second high threshold.

The master power management circuitry may be implemented on a first semiconductor device and the slave power management circuitry may be implemented on a second semiconductor device.

The cascaded power supply may further include a processor that provides the low power mode signal and that receives the low power good signal. The processor may be configured to only transition from the normal mode to the low power mode when the low power good signal is asserted, and to only transition from the low power mode to the normal mode when the low power good signal is de-asserted. The master power management circuitry may be implemented on a first semiconductor device, the slave power management circuitry may be implemented on a second semiconductor device, and the processor may be implemented on a third semiconductor device.

A method according to one embodiment includes providing master power management circuitry and providing slave power management circuitry. The providing master power management circuitry may include providing a supply voltage during a normal mode and discharging the supply voltage during a low power mode, monitoring voltage levels of the supply voltage and a core voltage and providing at least one status signal indicative thereof, de-asserting a slave enable signal and disabling the master power regulator when a low power mode signal is asserted for transitioning from the normal mode to the low power mode, and asserting a low power good signal when the at least one status signal indicates that the supply voltage is discharged below a first low threshold and that the core voltage is discharged below a second low threshold. The providing slave power management circuitry may include providing the core voltage when the slave enable signal is asserted for the normal mode, and otherwise discharging the core voltage for the low power mode.

The method may further include commanding the master power regulator to charge the supply voltage when the low power mode signal is de-asserted, asserting the slave enable signal when the supply voltage is at least a first high threshold, asserting the synchronization signal when the core voltage reaches a regulation level, and de-asserting the low power good signal to enter the normal mode when a synchronization signal is asserted after the slave enable signal is asserted. The method may include de-asserting the low power good signal to enter the normal mode only after the core voltage is at least a second high threshold.

The method may include commanding the master power regulator to charge the supply voltage and when the low power mode signal is de-asserted, asserting the slave enable signal when the supply voltage is at least a first high threshold, and de-asserting the low power good signal to enter the normal mode only after the core voltage is at least a second high threshold.

The method may include providing a processor that provides the low power mode signal and that receives the low power good signal. The method may include transitioning, by the processor, from the normal mode to the low power mode only when the low power good signal is asserted, and transitioning, by the processor, from the low power mode to the normal mode only when the low power good signal is de-asserted.

A processing system according to one embodiment includes a cascaded power management system and a processor. The cascaded power management system may include master power management circuitry and slave power management circuitry. The master power management circuitry may include a master power regulator that provides a supply voltage during a normal mode and that discharges the supply voltage during a low power mode, comparator circuitry that monitors voltage levels of the supply voltage and a core voltage and that provides at least one status signal indicative thereof, and control circuitry that de-asserts a slave enable signal and disables the master power regulator when a low power mode signal is asserted for transitioning from a normal mode to a low power mode, and that asserts a low power good signal when the at least one status signal indicates that the supply voltage is discharged below a first low threshold and that the core voltage is discharged below a second low threshold. The slave power management circuitry may provide the core voltage when the slave enable signal is asserted for the normal mode, and may discharge the core voltage when the slave enable signal is de-asserted for the low power mode. The processor may include power supply circuitry that receives the supply voltage and the core voltage, and low power domain circuitry that provides the low power mode signal and that receives the low power good signal. The processor may be configured to only transition from the normal mode to the low power mode when the low power good signal is asserted, and to only transition from the low power mode to the normal mode when the low power good signal is de-asserted.

A cascaded power system may include master power management circuitry and slave power management circuitry. The master circuitry may include a master power regulator, comparator circuitry, and control circuitry. The power regulator may provide a supply voltage during a normal mode and may discharge the supply voltage during a low power mode. The slave circuitry may provide a core voltage when enabled and otherwise discharge the core voltage. The comparator circuitry may monitor the voltage levels of the supply and core voltages and the control circuitry may perform handshaking with the slave circuitry based partly on the voltages to ensure smooth transitioning between the normal and low power modes. The control circuitry may assert a low power good signal when the supply and core voltages are discharged, and may de-assert the low power good signal when the supply and core voltages are fully charged. A processor may rely on the low power mode signal for transitioning between power modes.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, a signal may be asserted high and de-asserted low, but may also be asserted low and de-asserted high depending upon whether the pin or signal is implemented in positive or negative logic or the like. In some cases, the particular logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:
1. A power supply, comprising:
master power management circuitry having, a master power regulator that provides a supply voltage during a normal mode and that discharges the supply voltage during a low power mode;
slave power management circuitry that provides a core voltage to a load device when a slave enable signal is received from the master power management circuitry and asserted for the normal mode, and that discharges the core voltage when the slave enable signal is de-asserted for the low power mode;
wherein the master power management circuitry includes comparator circuitry that directly monitors voltage levels of both the supply voltage and the core voltage and that provides a status signal indicative thereof; and
wherein the master power management circuitry includes control circuitry,
that de-asserts the slave enable signal and commands the master power regulator to discharge the supply voltage when a low power mode signal is asserted by the load device for transitioning from the normal mode to the low power mode, and
that asserts a low power good signal when the status signal indicates that both the supply voltage is discharged below a first low threshold and that the core voltage is discharged below a second low threshold.
2. The power supply of claim 1,
wherein: the control circuitry commands the master power regulator to charge the supply voltage when the low power mode signal is de-asserted, asserts the slave enable signal when the supply voltage is at least a first high threshold, and de-asserts the low power good signal to enter the normal mode when a synchronization signal is asserted after the slave enable signal is asserted; and wherein the slave power management circuitry asserts the synchronization signal when the core voltage reaches a regulation level.

3. The power supply of claim 2,
wherein the control circuitry de-asserts the low power good signal to enter the normal mode only after the core voltage is at least a second high threshold.

4. The power supply of claim 1,
wherein the control circuitry commands the master power regulator to charge the supply voltage when the low power mode signal is de-asserted, asserts the slave enable signal when the supply voltage is at least a first high threshold, and de-asserts the low power good signal to enter the normal mode only after the core voltage is at least a second high threshold.

5. The power supply of claim 1,
wherein the master power management circuitry is implemented on a first semiconductor device,
wherein the slave power management circuitry is implemented on a second semiconductor device; and
wherein the slave power management circuitry only receives power from the master power management circuitry.

6. The power supply of claim 1,
wherein the load device is a processor that provides the low power mode signal and that receives the low power good signal.

7. The power supply of claim 6,
wherein the processor only transitions from the normal mode to the low power mode when the low power good signal is asserted, and only transitions from the low power mode to the normal mode when the low power good signal is de-asserted.

8. The power supply of claim 6, wherein the master power management circuitry is implemented on a first semiconductor device, wherein the slave power management circuitry is implemented on a second semiconductor device, and wherein the processor is implemented on a third semiconductor device.

9. A method, comprising:
configuring master power management circuitry to provide a supply voltage during a normal mode and discharge the supply voltage during a low power mode;
configuring slave power management circuitry to provide a core voltage to a load device when a slave enable signal is received from the master power management circuitry and is asserted for the normal mode, and otherwise discharging the core voltage for the low power mode;
configuring the master power management circuitry to directly monitor voltage levels of both the supply voltage and the core voltage and providing a status signal indicative thereof; and
configuring the master power management circuitry to de-assert the slave enable signal and command the master power regulator to discharge the supply voltage when a low power mode signal is asserted by the load device for transitioning from a normal mode to a low power mode, and asserting a low power good signal when the status signal indicates that both the supply voltage is discharged below a first low threshold and that the core voltage is discharged below a second low threshold.

10. The method of claim 9, further comprising:
commanding the master power regulator to charge the supply voltage when the low power mode signal is de-asserted;
asserting the slave enable signal when the supply voltage is at least a first high threshold;
asserting the synchronization signal when the core voltage reaches a regulation level; and
de-asserting the low power good signal to enter the normal mode when a synchronization signal is asserted after the slave enable signal is asserted.

11. The method of claim 10, further comprising
de-asserting the low power good signal to enter the normal mode only after the core voltage is at least a second high threshold.

12. The method of claim 9, further comprising:
commanding the master power regulator to charge the supply voltage when the low power mode signal is de-asserted;
asserting the slave enable signal when the supply voltage is at least a first high threshold; and
de-asserting the low power good signal to enter the normal mode only after the core voltage is at least a second high threshold.

13. The method of claim 9,
wherein the providing master power management circuitry comprises providing the master power management circuitry on a first semiconductor device, and
wherein the providing slave power management circuitry comprises providing the slave power management circuitry on a second semiconductor device.

14. The method of claim 9, further comprising
providing a processor that provides the low power mode signal and that receives the low power good signal.

15. A processing system, comprising:
a cascaded power management system including master power management circuitry having, a master power regulator that provides a supply voltage during a normal mode and that discharges the supply voltage during a low power mode;
slave power management circuitry that provides a core voltage to a load device when a slave enable signal is received from the master power management circuitry and asserted for the normal mode, and that discharges the core voltage when the slave enable signal is de-asserted for the low power mode;
wherein the master power management circuitry includes comparator circuitry that directly monitors voltage levels of the supply voltage and the core voltage and that provides a status signal indicative thereof; and
wherein the master power management circuitry includes control circuitry that de-asserts the slave enable signal and commands the master power regulator to discharge the supply voltage when a low power mode signal is asserted by the load device for transitioning from the normal mode to the low power mode, and that asserts a low power good signal when the status signal indicates that both the supply voltage is discharged below a first low threshold and that the core voltage is discharged below a second low threshold; and
a processor having power supply circuitry that receives the supply voltage and the core voltage and having low power domain circuitry that provides the low power mode signal and that receives the low power good signal, wherein the processor only transitions from the normal mode to the low power mode when the low power good signal is asserted, and only transitions from the low power mode to the normal mode when the low power good signal is de-asserted.

16. The processing system of claim 15, wherein:
the control circuitry commands the master power regulator to charge the supply voltage when the low power mode signal is de-asserted, asserts the slave enable signal when the supply voltage is at least a first high threshold, and de-asserts the low power good signal to enter the normal mode when a synchronization signal is asserted after the slave enable signal is asserted; and
wherein the slave power management circuitry asserts the synchronization signal when the core voltage reaches a regulation level.

17. The processing system of claim 16, wherein the control circuitry de-asserts the low power good signal to enter the normal mode only after the core voltage is at least a second high threshold.

18. The processing system of claim 15, wherein the control circuitry commands the master power regulator to charge the supply voltage when the low power mode signal is de-asserted, asserts the slave enable signal when the supply voltage is at least a first high threshold, and de-asserts the low power good signal to enter the normal mode only after the core voltage is at least a second high threshold.

19. The processing system of claim 15, wherein the master power management circuitry is implemented on a first semiconductor device, and wherein the slave power management circuitry is implemented on a second semiconductor device.

20. The processing system of claim 15, wherein the load device is a processor that provides the low power mode signal and that receives the low power good signal.

* * * * *